May 27, 1924.

T. J. FETCHER

TRACTOR BRAKE

Filed June 29, 1922    2 Sheets-Sheet 1

1,495,971

INVENTOR:
Theophil J. Fetcher
BY A. M. Carlsen
ATTORNEY

May 27, 1924.
T. J. FETCHER
TRACTOR BRAKE
Filed June 29, 1922
1,495,971
2 Sheets-Sheet 2
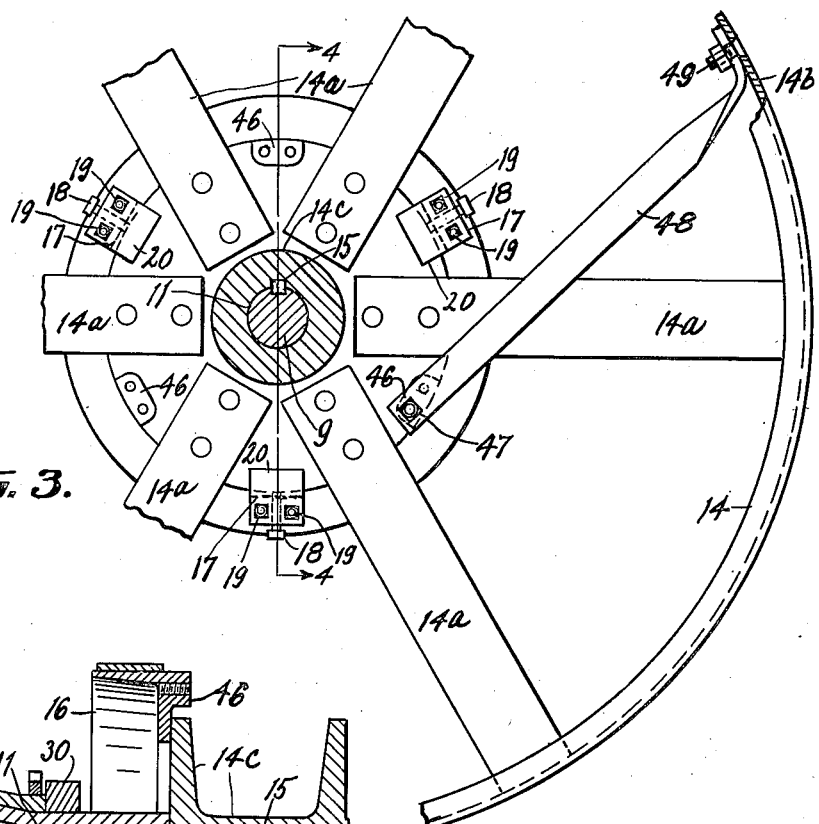
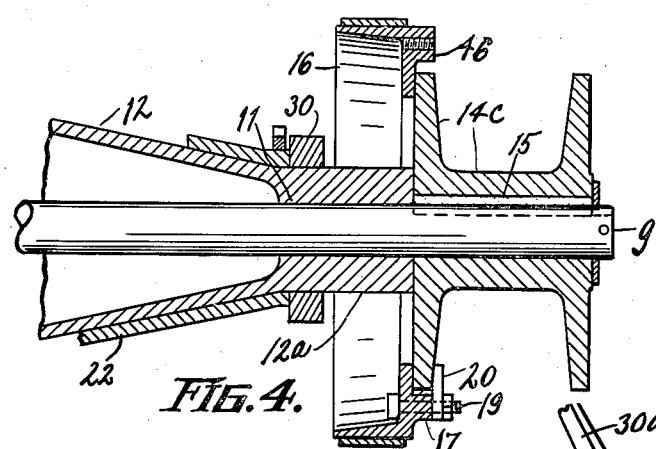
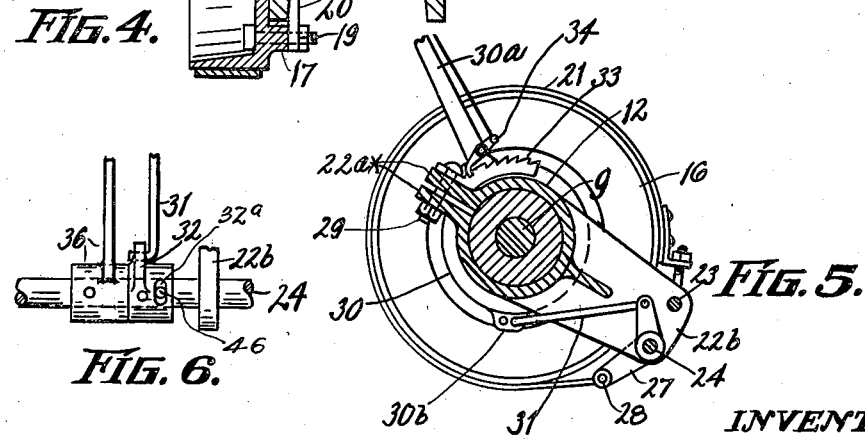
INVENTOR.
Theophil J. Fetcher.
BY A. M. Carlsen
ATTORNEY.

Patented May 27, 1924.

1,495,971

UNITED STATES PATENT OFFICE.

THEOPHIL J. FETCHER, OF NORWALK, WISCONSIN, ASSIGNOR OF ONE-HALF TO ALVIN ZELLMER, OF NORWALK, WISCONSIN.

TRACTOR BRAKE.

Application filed June 29, 1922. Serial No. 571,711.

*To all whom it may concern:*

Be it known that I, THEOPHIL J. FETCHER, a citizen of the United States, residing at Norwalk, in the county of Monroe and State of Wisconsin, have invented certain new and useful Improvements in Tractor Brakes, of which the following is a specification.

My invention relates to brakes for tractors and more particularly to brakes removably attached on the smaller types of tractors, one brake adjacent each drive wheel operated either by hand or foot or by both hands and feet when so desired.

The object is to provide a brake for positively holding either or both drive wheels on tractors which have no other than the so called transmission brake.

Among the features of my brake, when it is desired to make a short turn, the brake on the inside of the turn may be applied and the power will be delivered to the outside drive wheel permitting a short turn to be made and both drive wheel brakes may also be applied when the tractor power pulley is in use, practically locking the drive wheels and holding the tractor steady without putting blocks under the wheels.

In the accompanying drawings:

Fig. 3 is an enlarged fractional view of either drive wheel showing the method of applying my brake drum to the hub thereof and a brace to the tire of the wheel.

Fig. 4 is a sectional elevation as on line 4—4 in Fig. 3 showing also a portion of the drive axle housing.

Fig. 5 is a detail elevation on line 5—5 in Fig. 2, the brake band hanger being omitted.

Fig. 6 is an enlarged detail view as on line 6—6 in Fig. 2.

Figure 1:
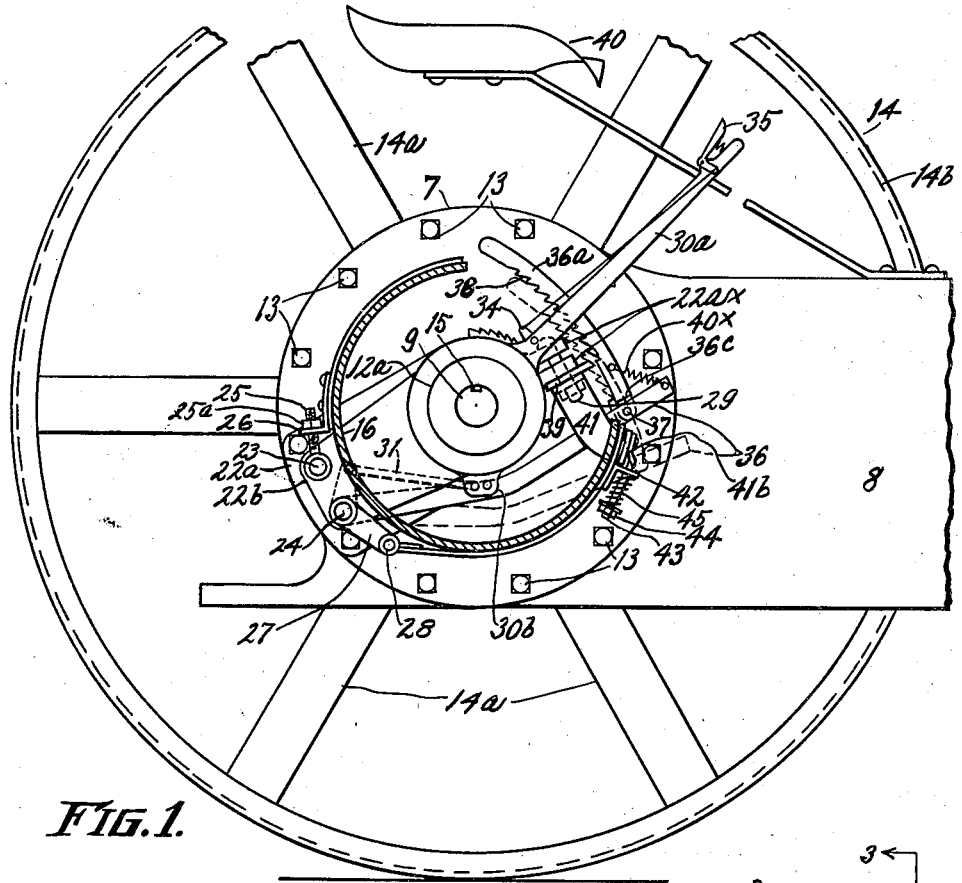
Fig. 1 is a side elevation of the rear portion of a tractor, from which the near side drive wheel has been removed, showing my improved brake for the right side partly broken away and the brake drum in section.

Referring to the drawings by reference numerals it will be understood that my device is particularly adapted to the type of tractors having a central differential housing 7 to the rear of the transmission housing 8, said differential housing containing the usual horizontally disposed differential (not shown) with right and left drive axles 9 and 10, respectively, the latter rotating each in bearings 11 formed at the outer end of each of two outwardly tapered axle housings 12 secured as at 13 to the differential housing.

A drive wheel 14, having spokes $14^a$, rim $14^b$ and a hub $14^c$, is keyed by a key 15 to the end of each drive shaft, protruding from the axle housing 12.

The working parts of my device may be considered two identical units, one for each drive wheel; therefore a description of only one of them will suffice for both.

I have illustrated a common type of axle housing 12 tapering to a straight cylindrical end portion $12^a$.

My device comprises an inwardly opening brake drum 16 having a number of vertically disposed faced bosses 17 spaced circumferentially to come between the spokes of the drive wheel and radially spaced slightly more than the diameter of the wheel hub flange $14^c$. Each boss is drilled and tapped radially to receive a set screw 18 and also tapped horizontally to receive two bolts 19, the latter to clamp a plate 20 against the inner side of the adjacent hub flange (see Figs. 3 and 4) and the former (18) to engage the rim of said hub flange and set the brake drum concentric with the drive axle.

A brake band 21 engages the outer face of the drum and is suspended and operated as follows:

A tapered semi-sleeve 22, preferably cast metal, and made to fit the tapered portion of the axle housing 12 has an inner rearwardly disposed arm $22^a$ secured to the differential housing 7 by bolts 13, and an outer rearwardly projecting arm $22^b$. Two parallel shafts 23, 24 are held in said arms $22^a$, $22^b$, of which 23 the upper one is stationary and its outer end protrudes beyond the arm $22^b$ to hold the eye bolt 25 (see Figs. 1 and 2) the threaded portion of the latter engaging an angle iron 26, secured on one end of the brake band, and having a nut $25^a$ for adjustment. The other shaft oscillates in the arms $22^a$, $22^b$, and has a lever arm 27 secured to its outer end the free end of said arm being pivotally connected as at 28 to the lower end of the brake band 21.

Figure 2:
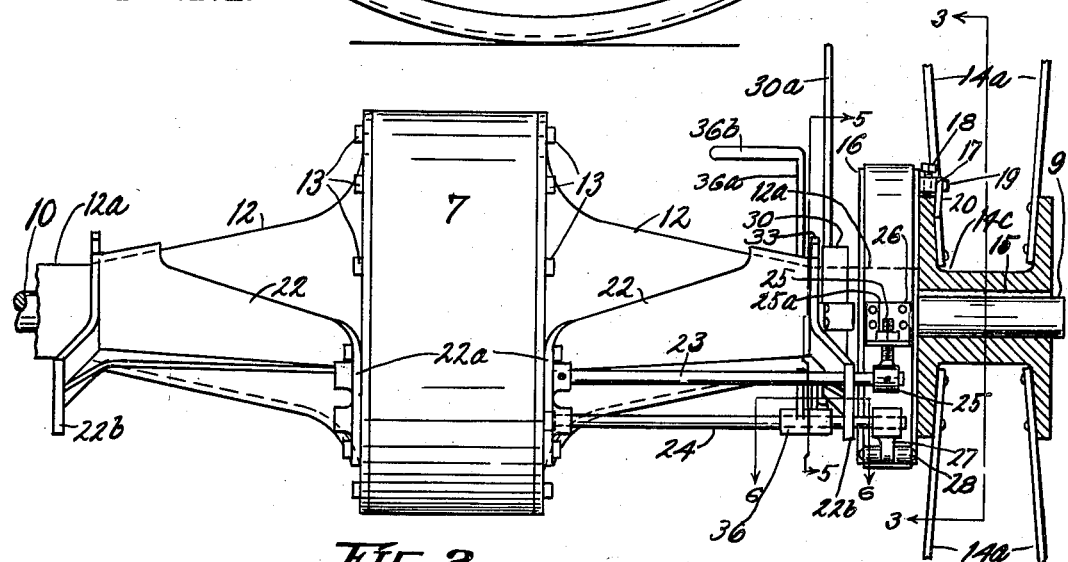
Fig. 2 is a rear view of Fig. 1 with the left hand drive wheel omitted and the hub portion of the right hand wheel shown in section.

The sleeve casting 22 is split horizontally at its forward and outer end and formed into two spaced lugs $22^{ax}$ perforated for clamping bolts 29 adapted to squeeze the said end of the sleeve casting on to the axle housing (see Figs. 1 and 5).

Adjacent the outer end of the sleeve casting 22 and on the straight portion 12ª of the axle housing 12, I mount rotatably, a ring 30 from the upper side of which extends a hand lever 30ª and on the lower side is provided a perforated lug 30ᵇ (Fig. 1) adapted to receive one end of a connecting rod 31 the rear end of which pivotally engages a lever 32 secured on shaft 24. By pulling rearwardly on hand lever 30ª, connecting rod 31 pulls lever 32 forward, shaft 24 rocks lever 27 rearwardly and the brake band is tightened. A toothed segment 33 suitably secured, as by the bolt 29, is engaged by a pawl 34 pivoted on the lever and thrown in and out of engagement by the finger lever 35 on the hand lever 30ª.

A foot brake operating the same shaft 24, lever 27 etc., comprises two members 36, 36ª of which 36 is a lever secured on shaft 24 and extends forward under the axle housing a predetermined distance. 36ª is an upright arched member the lower end of which is pivotally secured as at 37 on the arm 36 and near the forward end of same. The inner edge of said member 36ª has notches 38 adapted to engage a permanent tooth 39 secured by bolt 29 against one of the lugs 22ª. The upper end of member 36ª may be bent inwardly as 36ᵇ forming an arm to be engaged by the foot of the tractor operator sitting in a seat 40 and located above the differential housing. A shoulder 36ᶜ on notched arm 36ª engages the lever 36 but permits a limited rocking movement of lever 36ª to permit its teeth to be pushed into and out of engagement with the tooth 39. Said lever is normally held forward by a coil spring 40ˣ (see Fig. 1) having one end secured in the extreme outer end of lever 36 and its other end secured in lever 36ª.

In Fig. 1 I have illustrated brake band suspending means the purpose of which is to support the brake band in such a manner that the band will not stick on the drum when released. It comprises merely a vertically disposed metallic hanger bracket 41 normally in vertical plane adjacent the inner side of the brake drum and having an upper, inwardly extended, perforated arm engaged by the bolts 29, and a lower, perforated arm 41ᵇ extending across the brake band in spaced relation thereto. An angle iron 42 secured on the brake band just below the said arm 41ᵇ is perforated for a bolt 43 one end of which is secured to said arm and the other end is threaded for a nut 44. A coil spring 45 is slipped over the bolt and may be compressed between the angle 42 and the nut 44 as desired. It will be readily seen that when the brake is applied the band will be drawn rearwardly with its lower end and the above described means will cause the band to be sprung back to normal position when the brake is released.

46 are bosses spaced alternately with the securing bosses on the outer side of each brake drum. They are drilled and tapped each to receive a cap screw or bolt 47 which holds the inner end of a brace 48. Said brace extends outwardly and is secured as at 49 to the steel tire of the wheel. The number of these braces will vary with the design of the wheel hub, but their purpose is to strengthen the brake drum and deliver the braking strain to the tire of the wheel.

My device, as previously mentioned, can be operated by either hand or foot or by both at the same time, but should it be desired to use the foot brake only the hand lever will not need to move, as I provide oppositely arranged slots 32ª in the hub of lever 32 on shaft 24. This slot is normally occupied by a diametrical pin 46 (see Fig. 6) fixed in shaft 24. The slot permits rotation of the brake shaft 24 by the foot lever 36 36ª, enough for ordinary braking purposes, but should the hand lever also be needed it can be used also.

In the operation of my device the driver of a tractor may use the hand or foot lever for tightening either brake band, for example, the right hand one, when he desires to make a short turn to the right. Such band tightening or contraction on the right side holds the right hand ground wheel (driving wheel) from turning and the differential gears will automatically cause the driving power to be transmitted to the left hand drive wheel, thus turning the tractor to the right, it being understood that the driver has already turned the steering wheels to the right. The foot levers are particularly useful while the driver is in the seat of the tractor.

When is it desired to hold the tractor stationary for some time, such as when the power pulley of the tractor is used to run various kinds of machinery, the driver may use both foot levers 36ª if he is seated in the tractor, but if not seated he may tighten both brake bands by using the hand levers 30ª. Both brakes being thus set the tractor will remain rigid until the bands are released.

What I claim is:

1. In a tractor having a central, vertically disposed differential housing, a drive axle housing secured thereto, one at each side, a drive axle journaled in said housing and protruding from the outer end of the housing, a drive wheel having a flanged hub and keyed on said protruding portion of the axle; a metallic sleeve partially encircling each drive axle housing and adapted to be secured thereto, each sleeve extending outwardly from the differential housing and terminating in a collar surrounding the axle housing, said collar being split forwardly and having two spaced, perforated lugs and means engaging said lugs for clamping the collar to the axle housing, an integral arm extending rearwardly from said collar in plane with the drive wheel but spaced away therefrom, a brake drum detachably secured to the inner flange of the drive wheel hub, a contracting brake band mounted on the brake drum, and brake band contracting means mounted on the sleeve.

2. The structure specified in claim 1, said brake band contracting means comprising two shafts arranged parallel longitudinally with relation to the drive axle of the tractor, one of them fixed in the sleeve and terminating adjacent the fixed end of the brake band, and adjustable means connecting the band and the shaft, the other shaft being rotatable and journaled in the sleeve, with its outer end adjacent the other end of the brake band, a forwardly and downwardly disposed rocker arm pivotally secured with its upper end to said end of the shaft and its lower end pivotally connected with the said end of the band, and means for rotating said rocker arm rearwardly to contract the band.

3. The structure specified in claim 2, said means for rotating the rocker arm comprising a horizontally disposed lever keyed to the rocker shaft, a vertically disposed arm having its lower end pivotally secured to said horizontal lever and means at its upper end adapted to be engaged by the foot of the person using the brake, a row of teeth on said vertical arm adapted to engage a tooth secured in the adjacent collar portion of the sleeve.

4. The structure specified in claim 3, and a hand lever for operating the brake band contracting means the pivot of said hand lever comprising a collar rotatably held on the axle housing adjacent the outer end of the sleeve, the hand lever being integral with the said collar and extending upwardly therefrom, a perforated lug on the collar and opposite the hand lever, a connecting rod pivotally engaging said lug with its forward end and its other end pivotally engaging a rocker arm on the rocker shaft.

5. The structure specified in claim 4, and a diametrically arranged pin secured in said rocker shaft, the opposite ends of said pin normally engaging in a transversely slotted portion of the hub of said rocker arm, for the purpose described.

6. A brake device for tractors comprising a brake drum detachably secured to each drive wheel hub, a contracting brake band adapted to engage each drum and dual operating means for each brake band, said brake drum comprising for each drive wheel, an inwardly opening brake drum with a vertically disposed outer web, a number of outwardly projecting lugs on said web spaced diametrically slightly further apart than the diameter of the wheel hub flange, a set screw arranged radially in each lug, a vertically disposed perforated plate for each lug and means comprising two or more set screws engaging the lug for clamping said plates against the outer surface of the said hub flange.

7. The structure specified in claim 6, and circularly arranged lugs spaced alternate with the brake drum securing lugs on the web of said drum, a brace secured with one end to each of said lugs and its other end secured to the rim of the drive wheel for the purpose set forth.

8. The structure specified in claim 1, and resilient brake band suspending means for holding said band normally in non-contacting concentric relation to the brake drum.

9. The structure specified in claim 8, said resilient suspending means comprising a hanger secured with one end to a stationary part of the sleeve and its other end located adjacent to and outside of the brake band, a bolt secured to the latter end and normally projecting through a perforated angle of an angle iron support secured on the brake band, a nut at the other end of said bolt, a spring interposed between said nut and the perforated angle and adapted to be compressed by said nut, for the purpose described.

In testimony whereof I affix my signature.

THEOPHIL J. FETCHER.